United States Patent
Nadgowda et al.

(10) Patent No.: US 11,463,478 B2
(45) Date of Patent: Oct. 4, 2022

(54) REMEDIATION STRATEGY OPTIMIZATION FOR DEVELOPMENT, SECURITY AND OPERATIONS (DEVSECOPS)

(71) Applicant: International Business Machines Corporation, Armonk, NY (US)

(72) Inventors: Shripad Nadgowda, Elmsford, NY (US); Alessandro Morari, New York, NY (US); James R. Doran, New Milford, CT (US)

(73) Assignee: International Business Machines Corporation, Armonk, NY (US)

(*) Notice: Subject to any disclaimer, the term of this patent is extended or adjusted under 35 U.S.C. 154(b) by 513 days.

(21) Appl. No.: 16/667,471

(22) Filed: Oct. 29, 2019

(65) Prior Publication Data

US 2021/0126949 A1    Apr. 29, 2021

(51) Int. Cl.
*H04L 9/40* (2022.01)
*G06F 8/71* (2018.01)

(52) U.S. Cl.
CPC .......... *H04L 63/20* (2013.01); *G06F 8/71* (2013.01); *H04L 63/1416* (2013.01); *H04L 63/1425* (2013.01); *H04L 63/1433* (2013.01)

(58) Field of Classification Search
CPC . H04L 63/20; H04L 63/1416; H04L 63/1425; H04L 63/1433; G06F 8/71
USPC ........................................................ 726/22
See application file for complete search history.

(56) References Cited

U.S. PATENT DOCUMENTS

| | | | |
|---|---|---|---|
| 5,873,097 A | 2/1999 | Harris et al. | |
| 7,206,827 B2 | 4/2007 | Viswanath et al. | |
| 7,596,778 B2 | 9/2009 | Kolawa et al. | |
| 7,653,893 B2 | 1/2010 | Neumann et al. | |
| 7,908,660 B2 * | 3/2011 | Bahl | H04L 41/28 726/25 |
| 7,930,727 B1 | 4/2011 | Baize et al. | |
| 7,971,049 B2 | 6/2011 | Tengaio et al. | |
| 8,200,634 B2 | 6/2012 | Driesen et al. | |
| 8,381,176 B1 * | 2/2013 | Bentley | G06F 8/30 717/106 |

(Continued)

FOREIGN PATENT DOCUMENTS

| CN | 103678118 B | 9/2016 |
|---|---|---|
| CN | 107169360 A | 9/2017 |

OTHER PUBLICATIONS

List of IBM Patents or Patent Applications Treated as Related; Nadgowda, S., U.S. Appl. No. 16/383,838, filed Apr. 15, 2019.

(Continued)

*Primary Examiner* — Kambiz Zand
*Assistant Examiner* — Mahabub S Ahmed
(74) *Attorney, Agent, or Firm* — Sherman IP LLP; Kenneth L. Sherman; Steven Laut

(57) ABSTRACT

A method provides for collecting data source images from multiple repositories. Application dependencies are discovered from the data source images. Status results are determined based on vulnerability and compliance scanning of all dependent sources for each data source image. The status results are aggregated across all data source images for each of the multiple repositories. Remediations are determined for violations indicated by the aggregated status results. Each of the remediations is aggregated and ordered to define a single global remediation solution.

20 Claims, 12 Drawing Sheets

(56) References Cited

U.S. PATENT DOCUMENTS

| | | | |
|---|---|---|---|
| 8,407,696 | B2 | 3/2013 | Alpern et al. |
| 9,213,541 | B2 | 12/2015 | Araya et al. |
| 9,367,305 | B1* | 6/2016 | Kumar ..................... G06F 8/71 |
| 9,456,004 | B2* | 9/2016 | Agrawal ............. H04L 63/1433 |
| 9,483,281 | B2 | 11/2016 | Bonczkowski et al. |
| 9,594,548 | B2 | 3/2017 | Pena et al. |
| 9,672,078 | B2 | 6/2017 | Kacin et al. |
| 10,032,032 | B2* | 7/2018 | Suarez ................. G06F 21/562 |
| 10,089,099 | B2 | 10/2018 | Chang et al. |
| 10,565,095 | B2* | 2/2020 | Malla .................. G06F 11/3684 |
| 10,671,384 | B1* | 6/2020 | Boynes .............. G06F 9/44526 |
| 10,691,810 | B1* | 6/2020 | Freitag ....................... G06F 8/71 |
| 10,769,250 | B1* | 9/2020 | Tautschnig ........... G06F 21/577 |
| 10,810,106 | B1* | 10/2020 | Amit .................. G06F 11/3604 |
| 10,956,132 | B1* | 3/2021 | Schneider ................ G06F 8/40 |
| 11,163,889 | B2* | 11/2021 | Sloane ..................... G06N 3/04 |
| 2003/0037320 | A1 | 2/2003 | Lovvik et al. |
| 2003/0153991 | A1* | 8/2003 | Visser .................. G06Q 10/10 700/83 |
| 2004/0060035 | A1 | 3/2004 | Ustaris et al. |
| 2006/0184935 | A1 | 8/2006 | Abels et al. |
| 2008/0244747 | A1* | 10/2008 | Gleichauf ........... H04L 63/1433 726/25 |
| 2009/0007093 | A1 | 1/2009 | Lin et al. |
| 2010/0050156 | A1* | 2/2010 | Bonanno ................. G06F 8/433 717/122 |
| 2012/0017280 | A1* | 1/2012 | Wiegenstein ........ G06F 21/577 726/25 |
| 2013/0067449 | A1* | 3/2013 | Sannidhanam ........... G06F 8/60 717/170 |
| 2013/0227695 | A1* | 8/2013 | Shankar ................ G06F 21/577 726/25 |
| 2013/0298244 | A1* | 11/2013 | Kumar .................... G06F 21/51 726/25 |
| 2014/0053135 | A1 | 2/2014 | Bird et al. |
| 2014/0095694 | A1 | 4/2014 | Kimmet et al. |
| 2014/0173739 | A1* | 6/2014 | Ahuja ................. H04L 63/1433 726/25 |
| 2015/0040231 | A1* | 2/2015 | Oliphant ................. G06F 21/50 726/25 |
| 2015/0040232 | A1* | 2/2015 | Oliphant ............ H04L 63/0281 726/25 |
| 2015/0100940 | A1* | 4/2015 | Mockus .................... G06F 8/70 717/101 |
| 2015/0268948 | A1* | 9/2015 | Plate ...................... G06F 21/577 717/123 |
| 2015/0319185 | A1* | 11/2015 | Kirti .................. H04L 63/1416 726/23 |
| 2015/0355895 | A1* | 12/2015 | Giammaria ......... G06F 11/3688 717/169 |
| 2016/0164905 | A1* | 6/2016 | Pinney Wood ....... G06F 21/577 726/25 |
| 2016/0205002 | A1* | 7/2016 | Rieke ..................... H04L 43/04 709/224 |
| 2016/0350081 | A1 | 12/2016 | Kumar et al. |
| 2017/0052772 | A1 | 2/2017 | Chen et al. |
| 2017/0090889 | A1 | 3/2017 | Hale et al. |
| 2017/0126712 | A1* | 5/2017 | Crabtree ................ G06N 20/00 |
| 2017/0177860 | A1* | 6/2017 | Suarez ................. G06F 9/45558 |
| 2017/0242665 | A1* | 8/2017 | Wang ........................ G06F 8/71 |
| 2018/0011700 | A1* | 1/2018 | Plate ......................... G06F 8/65 |
| 2018/0013784 | A1* | 1/2018 | Rorabaugh ........... G06F 21/577 |
| 2018/0025160 | A1* | 1/2018 | Hwang ................... G06F 9/455 726/25 |
| 2018/0191867 | A1* | 7/2018 | Siebel ..................... H04L 69/40 |
| 2018/0196655 | A1* | 7/2018 | Kapoor ..................... G06F 8/65 |
| 2018/0300499 | A1* | 10/2018 | Agarwal ................... G06F 8/60 |
| 2018/0309747 | A1* | 10/2018 | Sweet ................. G06F 9/45558 |
| 2018/0373507 | A1* | 12/2018 | Mizrahi ................... G06F 8/433 |
| 2019/0026474 | A1 | 1/2019 | Adam et al. |
| 2019/0042737 | A1* | 2/2019 | Krebs ................... H04L 43/062 |
| 2019/0042759 | A1* | 2/2019 | Smith ................... G06F 21/74 |
| 2019/0227794 | A1* | 7/2019 | Mercilie ................... G06F 8/36 |
| 2019/0235861 | A1* | 8/2019 | Suarez ....................... G06F 8/71 |
| 2019/0312800 | A1* | 10/2019 | Schibler ................... G06F 8/65 |
| 2020/0074084 | A1* | 3/2020 | Dorrans ................ G06F 21/577 |
| 2020/0082094 | A1* | 3/2020 | Mcallister ................. G06F 8/77 |
| 2020/0082095 | A1* | 3/2020 | Mcallister ............ G06F 11/323 |
| 2020/0097662 | A1* | 3/2020 | Hufsmith .............. H04L 9/0643 |
| 2020/0117737 | A1* | 4/2020 | Gopalakrishnan ........................... G06F 16/9535 |
| 2020/0159525 | A1* | 5/2020 | Bhalla .................... G06F 21/563 |
| 2020/0202006 | A1* | 6/2020 | Shah ....................... G06F 8/433 |
| 2020/0202007 | A1* | 6/2020 | Nagaraja ............. G06F 11/3684 |
| 2020/0364042 | A1* | 11/2020 | Wuensche ................ G06F 8/77 |
| 2020/0371898 | A1* | 11/2020 | Aouad ................ G06F 11/3616 |
| 2020/0394310 | A1* | 12/2020 | Sloane ....................... G06F 8/65 |
| 2021/0012012 | A1* | 1/2021 | Soroush ................. G06N 5/04 |
| 2021/0029108 | A1* | 1/2021 | Obando Chacon ... G06F 21/604 |
| 2021/0034413 | A1* | 2/2021 | Ballantyne ............ G06F 9/4881 |
| 2021/0089978 | A1* | 3/2021 | Girdhar ................. H04L 63/205 |
| 2021/0120019 | A1* | 4/2021 | Chen .................. G06F 9/45558 |

OTHER PUBLICATIONS

Mell et al., "The NIST Definition of Cloud Computing," National Institute of Standards and Technology Special Publication 800-145, Sep. 2011, 7 pages.

Rao, N.R. et al., "A Methodological Review Based Version Control System with Evolutionary Research for Software Processes," Proceedings of the Second International Conference on Information and Communication Technology for Competitive Strategies (ICTCS '16), Mar. 2016, 6 pages, Article 14, ACM, New York, NY, USA.

\* cited by examiner

700

```
1   FROM golang:1.10.0-alpine3.7                                                    710
2
3   RUN apk add --update --no-cache alpine-sdk bash ca-certificates \                720
4       libressl \
5       tar \
6       git openssh openssl yajl-dev zlib-dev cyrus-sasl-dev openssl-dev build-base coreutils
7   WORKDIR /root
8   RUN git clone https://github.com/edenhill/librdka.git                            730
9   WORKDIR /root/librdkafka
10  RUN /root/librdkafka/configure
11  RUN make
12  RUN make install
13  #For golang applications
14  RUN mkdir /lib64 && ln -s /lib/libc.musl-x86_64.so.1 /lib64/ld-linux-x86-64.so.2
15
16  ENV MYSPECIALPROJECT "cis-operator"
17  WORKDIR /go/scr/github.ibm.com/$MYSPECIALPROJECT
18
19  RUN go get -d -v github.com/confluentinc/confluent-kafka-go/kafka                 740
20  RUN go get -d -v github.com/minio/minio-go
21
22  COPY . .
23  RUN GOOS=linux go build -a -installsuffix cgo -o app ./cmd/manager/main.go ./cmd/manager/start.go
24
25  CMD ["./app"]
26
```

FIG. 7

REMEDIATION STRATEGY OPTIMIZATION FOR DEVELOPMENT, SECURITY AND OPERATIONS (DEVSECOPS)

BACKGROUND

The present invention relates to vulnerability and compliance remediations for security vulnerabilities of computing applications and services.

SUMMARY

Embodiments relate to optimizing a global remediation strategy. One embodiment provides a method for collecting data source images from multiple repositories. Application dependencies are discovered from the data source images. Status results are determined based on vulnerability and compliance scanning of all dependent sources for each data source image. The status results are aggregated across all data source images for each of the multiple repositories. Remediations are determined for violations indicated by the aggregated status results. Each of the remediations is aggregated and ordered to define a single global remediation solution.

These and other features, aspects and advantages of the present embodiments will become understood with reference to the following description, appended claims and accompanying figures.

BRIEF DESCRIPTION OF THE DRAWINGS

FIG. 7 illustrates an example of an overview for discovery and commands for image scanning remediation, according to one embodiment;

DETAILED DESCRIPTION

Figure 1:
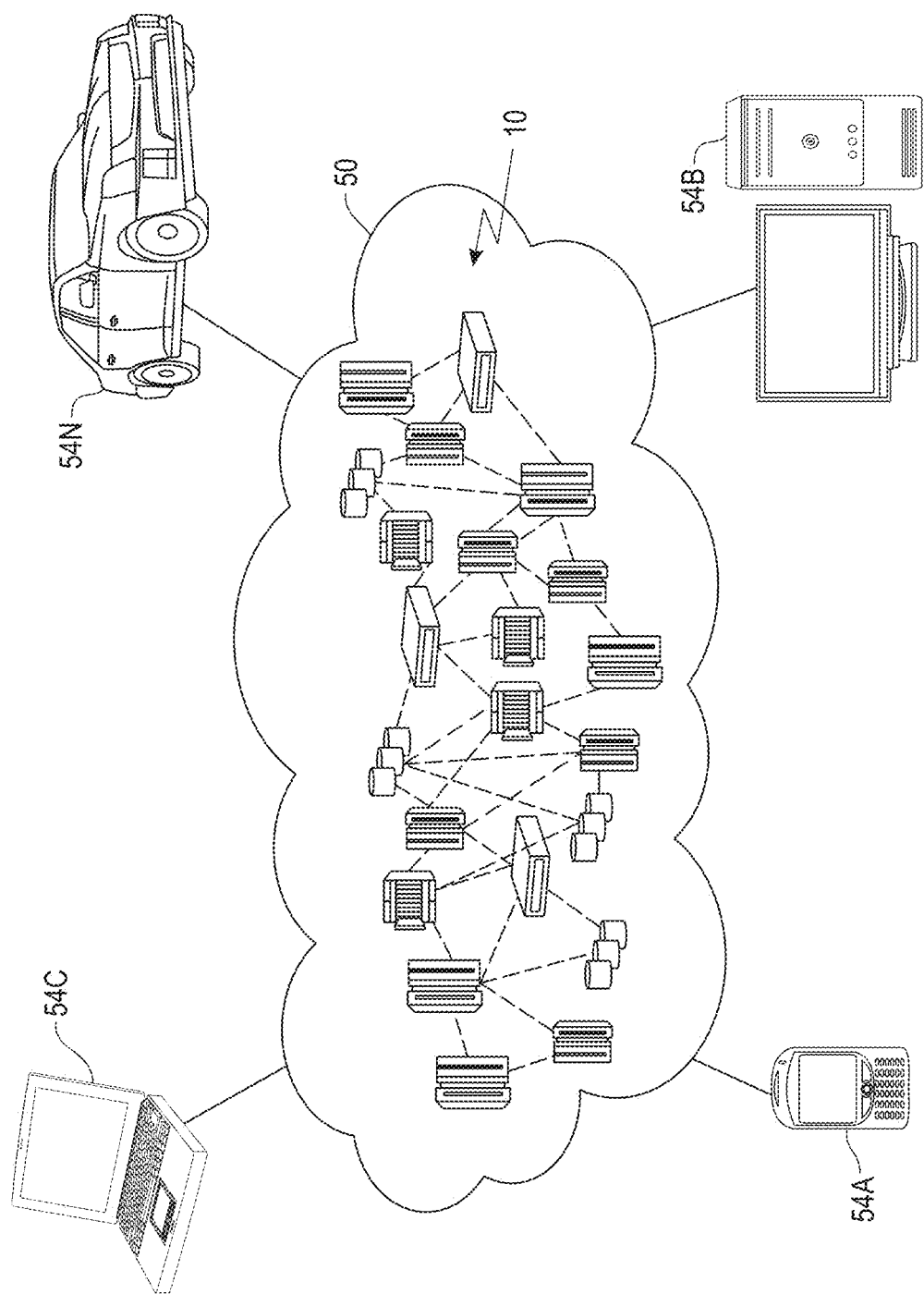
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A container image is a file that defines which data and processes should exist inside a particular container when it executes. That is, a container image is a blueprint for the specific application or service that runs inside a given container. The images may be uploaded to a container registry, which is a repository of container images that can be downloaded when it is desired to execute a container.

Development, security and operations (DevSecOps) has an objective of implementing security decisions and actions at the same scale and speed as development and operations decisions and actions. A DevSecOps framework ensures security is built into applications. Part of a DevSecOps framework is image security scanning. Image security scanning is a process for finding security vulnerabilities within image files. Typically, image scanning works by parsing through the packages or other dependencies that are defined in a container image file, then checking to see whether there are any known vulnerabilities in those packages or dependencies.

Some issues of security scanning are that there is no clear provenance of vulnerability/compliance from a container image. By scanning a container image, it is difficult to distinguish a source of vulnerability/compliance across the base image, other dependent components or additions during a build process. Remediation of vulnerabilities are performed per image. These remediations have a lack of visibility into other application dependencies, which results into potentially duplicate remediation actions.

Embodiments relate to optimizing a global remediation strategy. One embodiment provides a method for collecting data source images from multiple repositories. Application dependencies are discovered from the data source images. Status (vulnerability and compliance) results are determined based on vulnerability and compliance scanning of all dependent sources for each data source image. The status results are aggregated across all data source images for each of the multiple repositories. Remediations are determined for violations indicated by the aggregated status results. Each of the remediations is aggregated and ordered to define a single global remediation solution.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
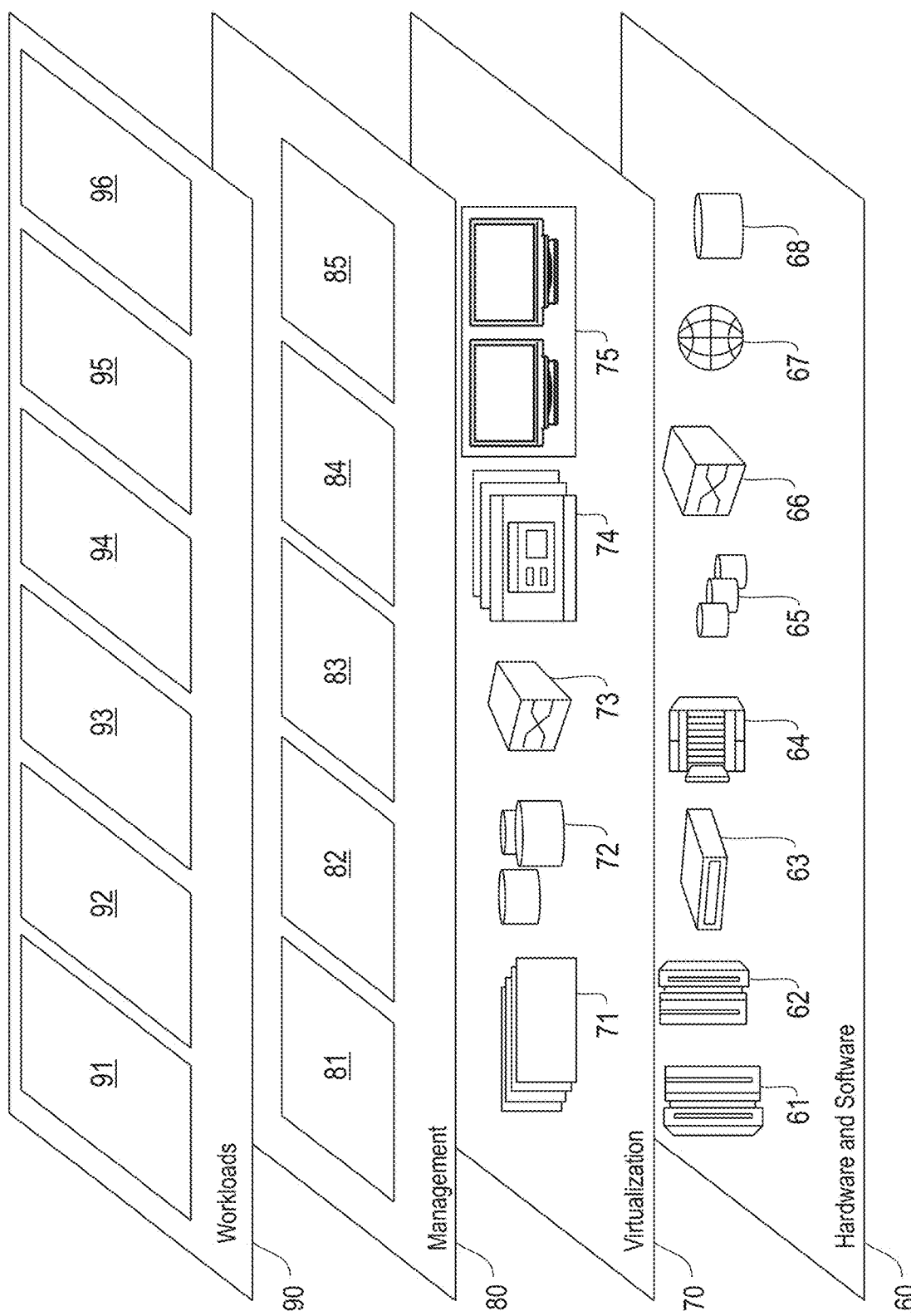
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing global remediation strategy processing 96 (see, e.g., system 500, FIG. 5, process 1200, FIG. 12). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
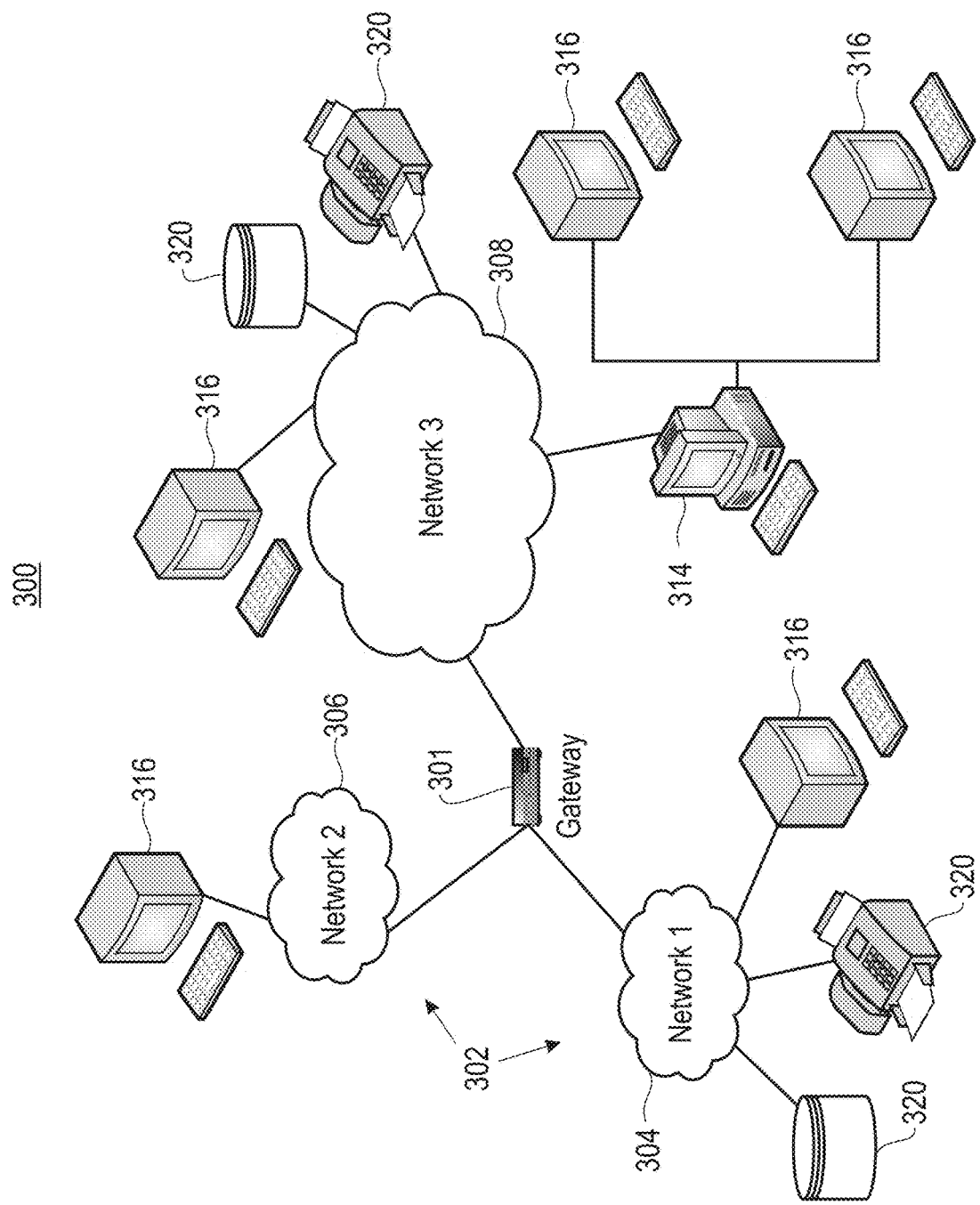
FIG. 3 is a network architecture of a system for optimizing a global remediation strategy processing, according to an embodiment.

FIG. 3 is a network architecture of a system 300 for optimizing a global remediation strategy processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
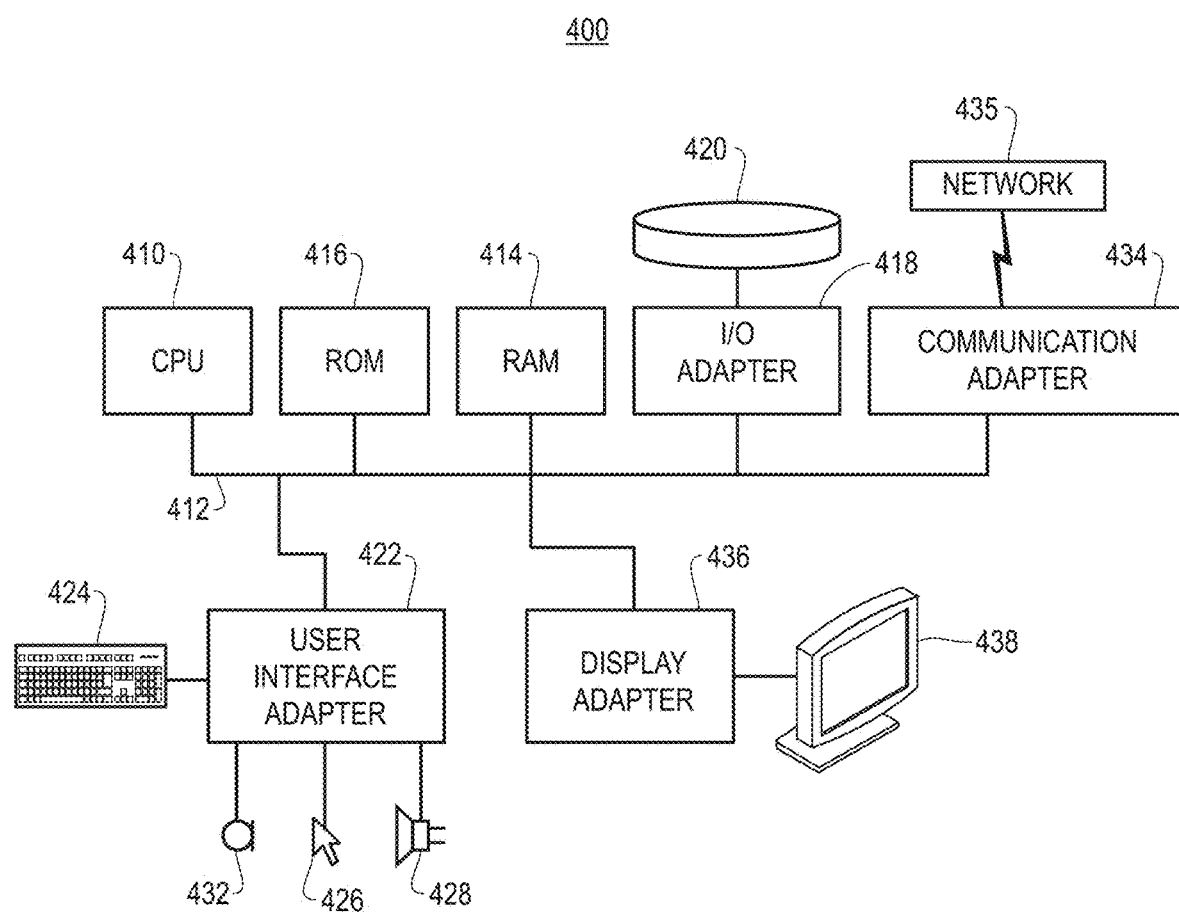
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
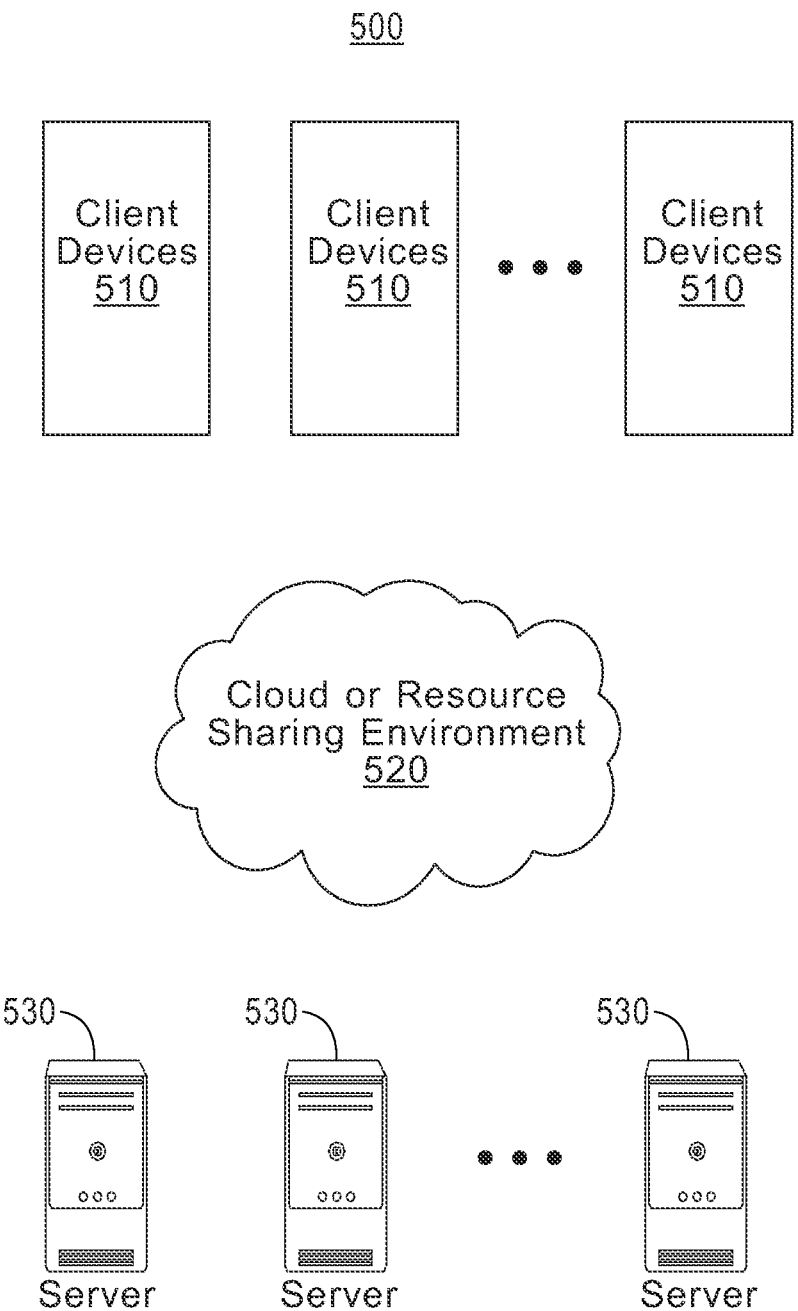
FIG. 5 is a block diagram illustrating a distributed system for optimizing remediation strategy for a Development, security and operations (DevSecOps) framework, according to one embodiment.

FIG. 5 is a block diagram illustrating a distributed system 500 that may be employed for optimizing remediation strategy processing for a DevSecOps framework, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Figure 6:
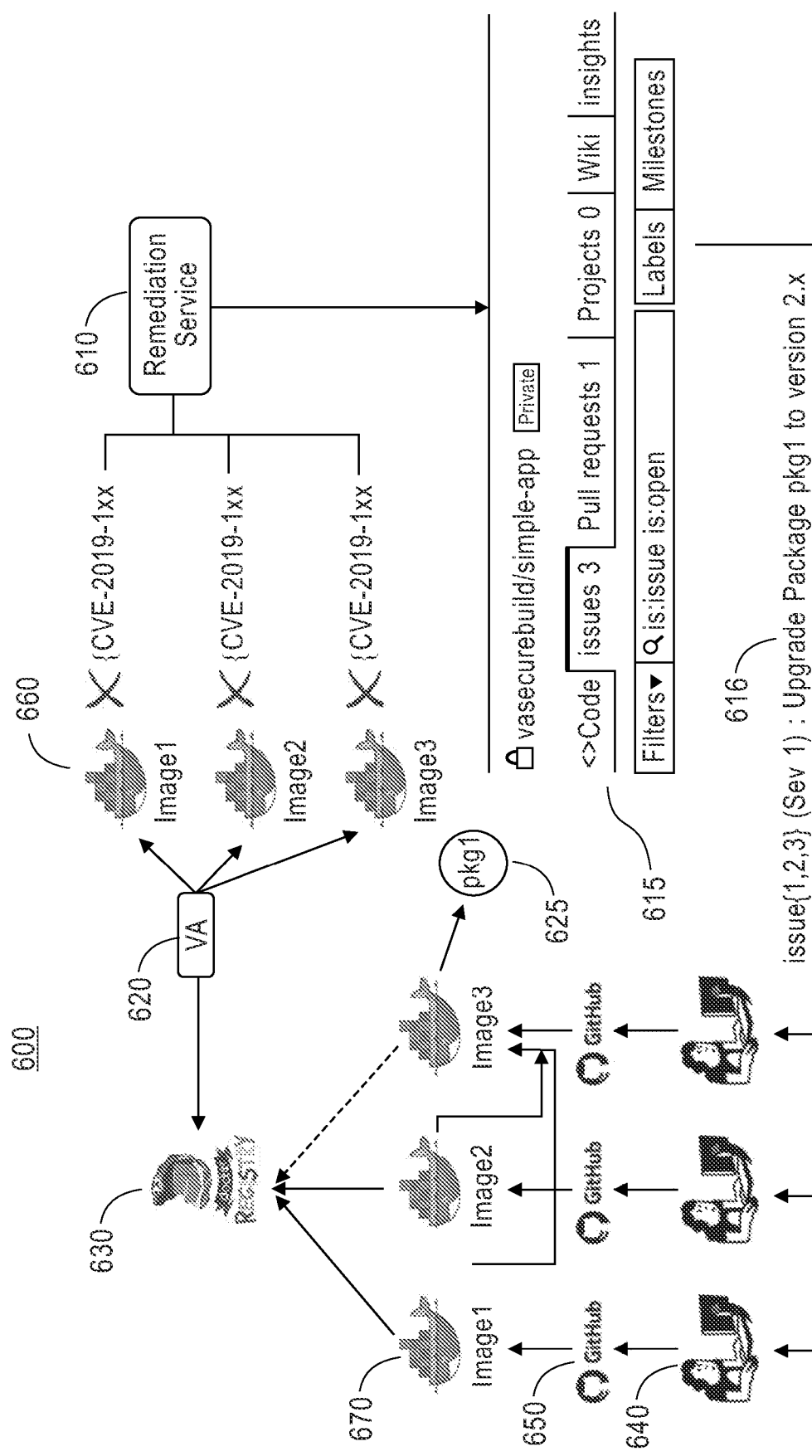
FIG. 6 illustrates a block diagram of a conventional remediation service for image scanning.

FIG. 6 illustrates an example block diagram 600 of a conventional remediation service 610 for image 660 scanning. A base image is the basic image on which layers are added (e.g., file system changes) that are used to create a final image (e.g., images 660/670 containing an app./application). A Git repository is virtual storage with version control that provides storage for saving images. In the example block diagram 600, the images 660 are scanned for vulnerability/compliance (V/C) by the vulnerability analyzer (VA) 620 and found to be vulnerable for an application (e.g., pkg1 625 referencing CVE-2019-1xx). It should be noted that cybersecurity common and (CVE) denotes a dictionary that provides definitions for publicly disclosed cybersecurity vulnerabilities and exposures. The goal of CVE is to make it easier to share data across separate vulnerability capabilities (tools, databases, and services) with these definitions. CVE Entries are comprised of an identification number, a description, and at least one public reference. The remediation service 610 finds a remediation analysis result 615 where there should be an upgrade 616 for package Pkg1 625 (e.g., upgrade from version 1.x for application pkg1 625 (with reference to CVE-2019-1xx) to version 2.x). The upgrade 616 in this example, however, has three (3) open issues. For the three (3) images 660, the upgrade 616 needs to be applied by personnel 640, and hosted using the Githubs 650 (e.g., hosting for software development version control using Git) to generate the images 670, which are stored in a registry 630 (e.g., a docker registry). The example has some challenges such as there is no clear provenance of vulnerability/non-compliance from the images 670. By scanning one image 660, it is difficult to distinguish the source of V/C across all of the base images, other dependent components or added components during the build process. In this example, remediation is applied per image 660, and there is a possibility of duplication of a remediation action.

Returning to FIG. 5, distinguishable from the example block diagram 600, system 500 implements V/C scanning prior to an image build, and scans various assets from Git repositories (e.g., a Dockerfile (text-based build script including various instructions that contains instructions in a sequence for building the images from base images), deployment YAML (data serialization language) structures, configuration files, etc.). In one embodiment, system 500 discovers all dependent elements for an application from the Git assets. System 500 further analyzes each discovered dependent element further to discover every V/C source by performing V/C scanning for all dependent sources for an image and indexes those sources into a graphical representation (see, e.g., FIGS. 8-9).

In one embodiment, system 500 establishes ordering of overrides (e.g., which sources to apply or ignore) amongst these sources. For example, if a source is a Dockerfile, then the order is implicit with the line ordering of dependent elements in the Dockerfile. System 500 indexes all application sources in the same graphical representation to perform a peer-to-peer application relations analysis. The analysis includes discovering dependencies between multiple applications (i.e., application dependencies), discovering commonalities between multiple applications (e.g., all applications using a same base image), and discovering outlier application builds (e.g., all except one is using different base image).

Figure 8:
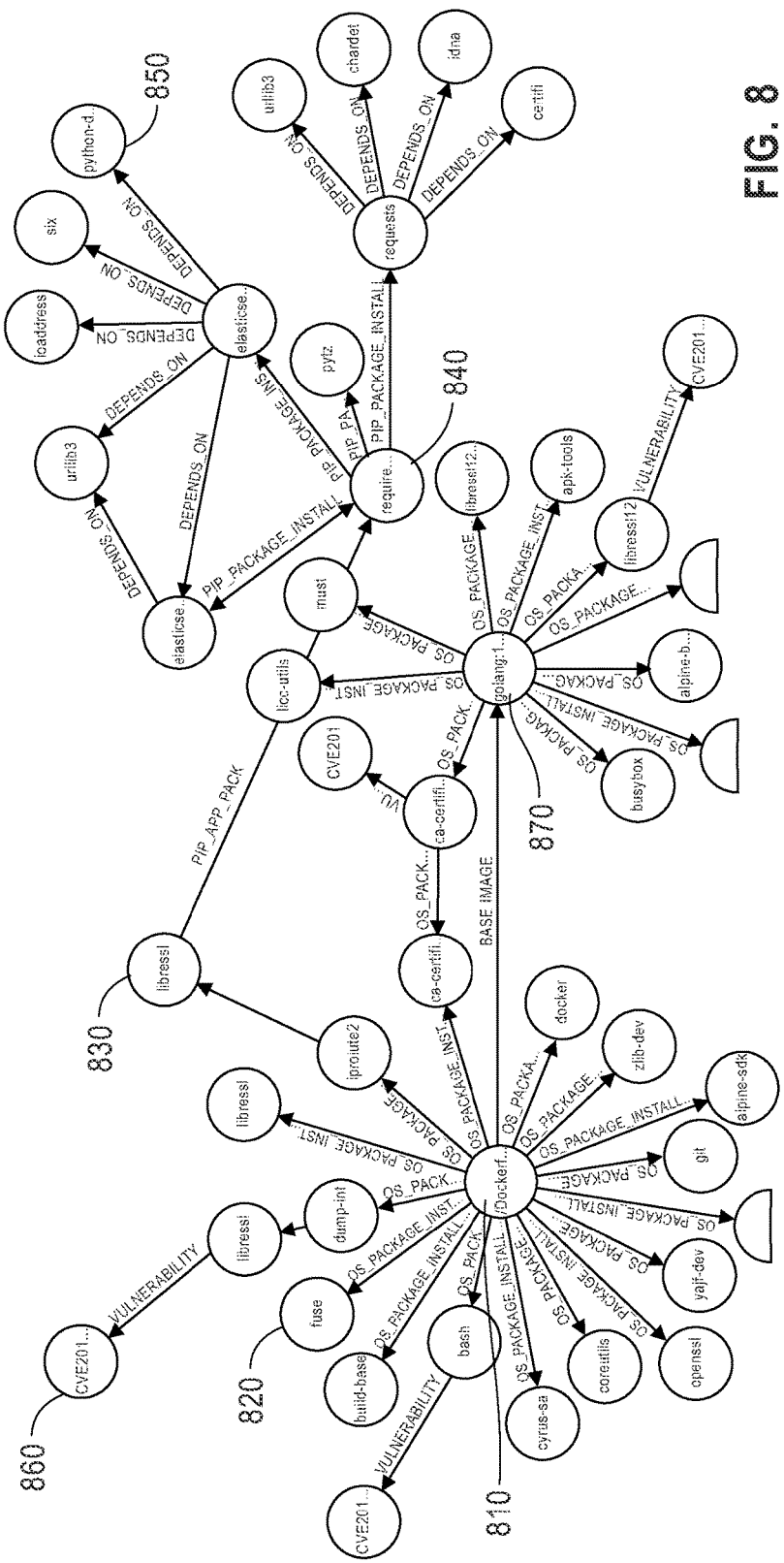
FIG. 8 illustrates an example of a graphical representation for image scanning remediation showing dependencies, according to one embodiment.
Figure 9:
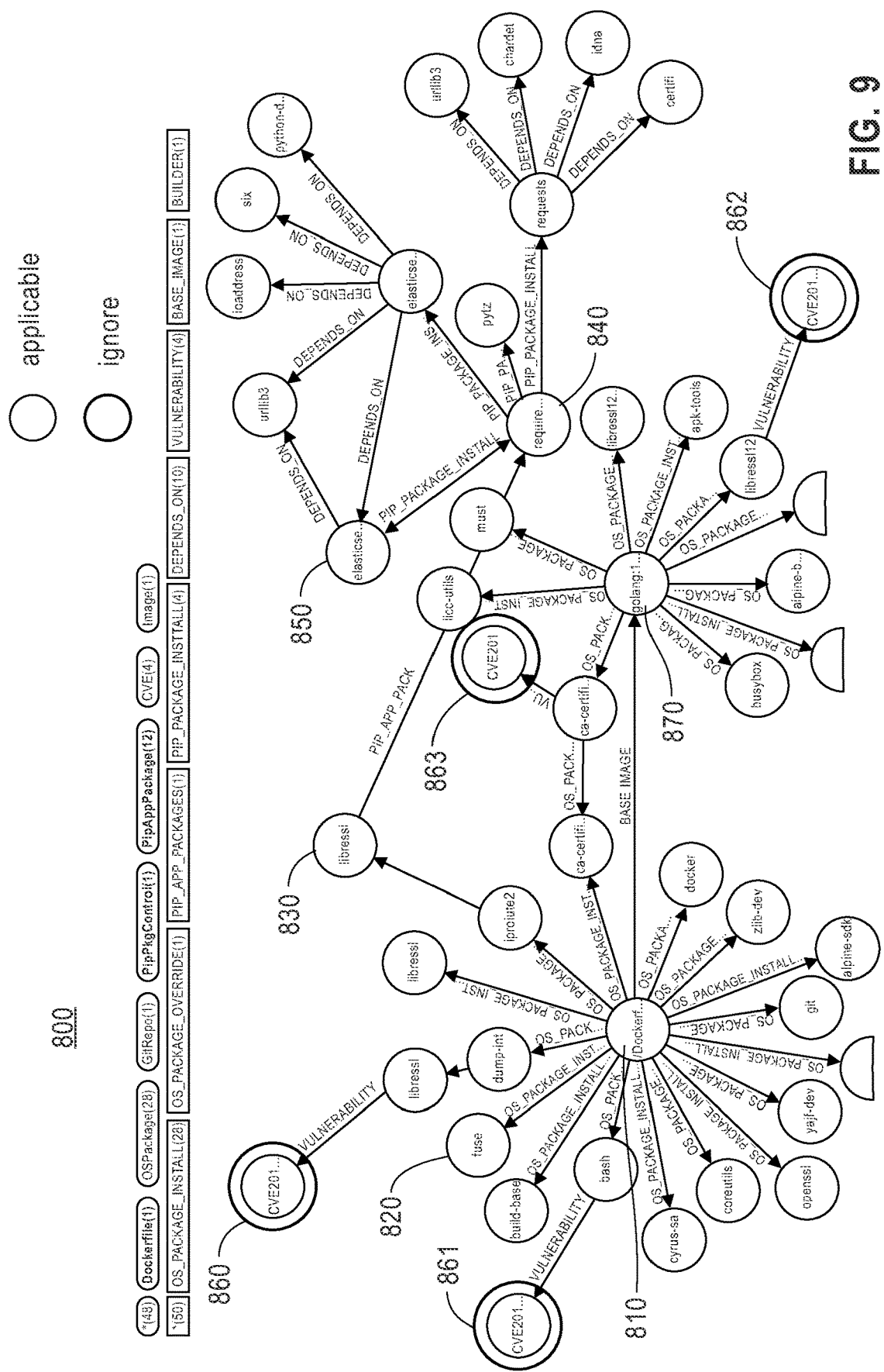
FIG. 9 illustrates an example result of applicable remediation indications for the example of FIG. 8, according to one embodiment.

In one embodiment, system 500 evaluates and determines the V/C status for every source in the graphical representation for an image (see, e.g., FIGS. 8-9). The V/C status for an application is then aggregated based on the status of individual dependent sources, where overridden V/Cs are ignored during the aggregation (e.g., if a vulnerability is found for some application package in the base image that is overridden in the higher (dependency) layers, then that vulnerable package is ignored). In one embodiment, the dependent sources are ordered into dependency layers based on application dependencies, where at least one dependent source is ordered into a top dependency layer and each remaining dependent source is ordered into one or more dependency layers that are lower than the top dependency layer. In one embodiment, the system 500 extends the V/C status to peer-to-peer application dependencies (e.g., if a first application is not vulnerable, but is dependent on a second application that is vulnerable, then the first application is marked with a same V/C status as the second application). System 500 then defines an optimal remediation solution to fix a vulnerability issue.

FIG. 7 illustrates an example file 700 of an overview for discovery and commands for image scanning remediation, according to one embodiment. In the source file 700, there are several portions for image building. The portions in the source file 700 include the base image 710 portion, the OS packages 720 portion, third party library 730 portion and application packages 740 portion. The base image 710 portion, the OS packages 720 portion, third party library 730 portion and application packages 740 portion are used to form a graphical representation to perform a peer-to-peer application relations analysis.

FIG. 8 illustrates an example of a graphical representation 800 for image scanning remediation showing dependencies, according to one embodiment. Graphical representation 800 shows a sample schema for a graph relationship and shows that discovery is deep and precise. The graphical representation 800 captures the source of vulnerabilities (in this example, OS and PYTHON® packages) and their dependencies. In one embodiment, the dependency information is leveraged to orchestrate the remediation strategy so that it is ensured that the vulnerabilities or non-compliances are addressed and fixed at the source. In one embodiment, the graphical representation 800 includes representations for a dockerfile 810, OS Packages 820, master (Git repository) 830, required update package 840 (PiPPckgControl: cross-platform package manager for installing and managing (Python) packages), PipAppPackages 850, common vulnerabilities and exposures (CVIS) 860 and base image 870. In one embodiment, the graphical representation 800 includes names, pseudo-names or abbreviated names for the displayed representations. The arrows/lines represent connections/dependencies for: OS package install, OS package override, PIP app packages, PIP package install, depends on, vulnerability, base image and builder. For the various displayed representations, the parenthesized numerals indicate the number of elements for the indicated type.

FIG. 9 illustrates an example result of applicable remediation indications for the example graphical representation 800 of FIG. 8, according to one embodiment. As shown, the vulnerabilities indicated are CVE 860, 861, 862 and 863, where CVE 860, 861 and 862 are indicated as applicable (i.e., these should be remediated vulnerabilities) and CVE 863 is indicated to be ignored (e.g., the vulnerability is found for some application package in the base image 870 that is overridden in the higher (dependency) layers, then that vulnerable package (CVE 863) is ignored).

Figure 10:
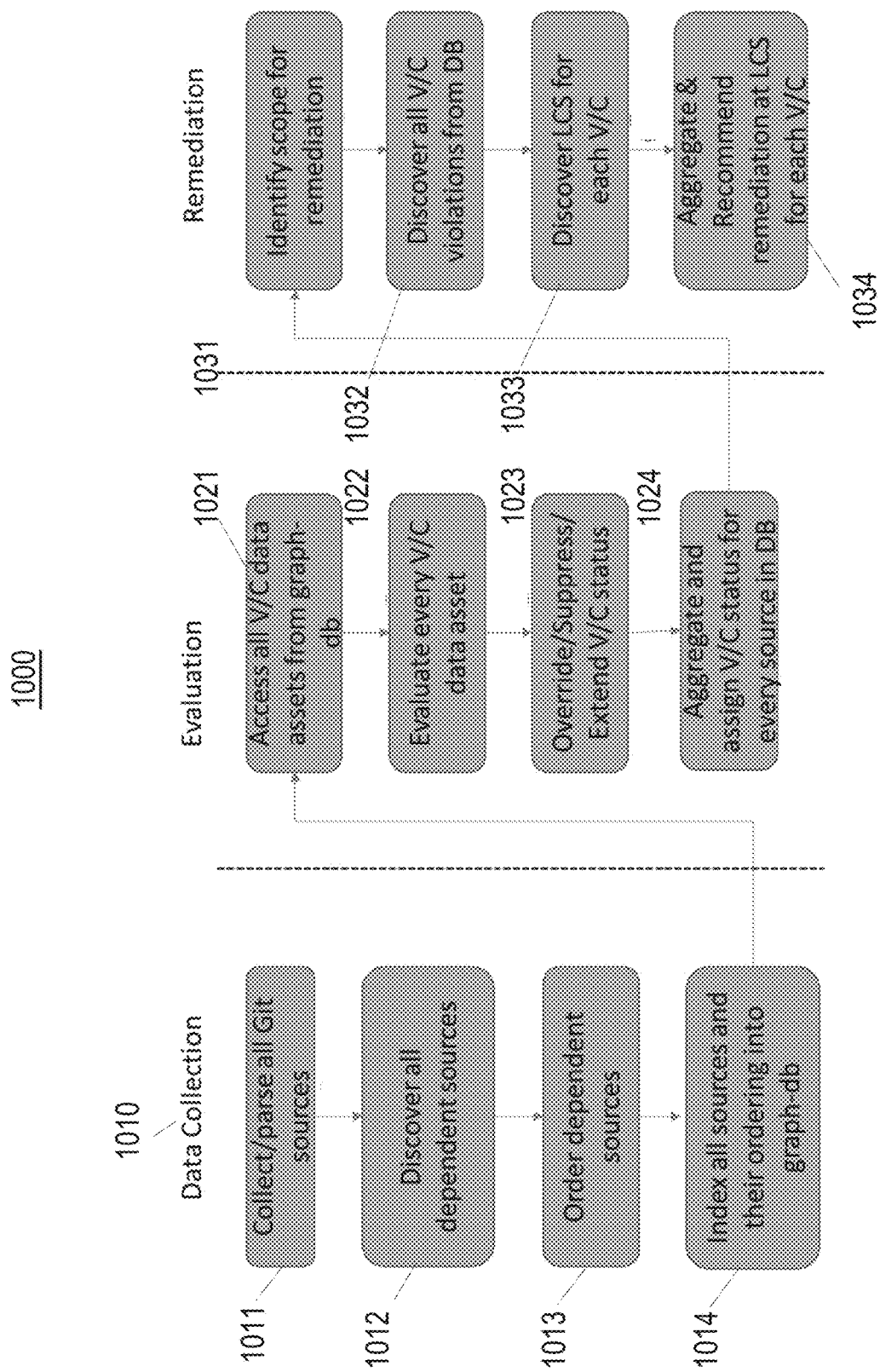
FIG. 10 illustrates a workflow diagram for optimizing remediation strategy for a DevSecOps framework, according to one embodiment.

FIG. 10 illustrates a workflow diagram 1000 for optimizing remediation strategy for a DevSecOps framework, according to one embodiment. In the workflow diagram 1000, there are three (3) phases: data collection 1010, evaluation 1020 and remediation 1030. In one embodiment, the data collection 1010 phase includes: collection and parsing of all Git sources (collect/parse all Git sources) 1011 processing, discover all dependent sources 1012 processing, order dependent sources 1013 processing and index all sources and their ordering into a graph database (graph-db) 1014 processing. In one embodiment, the collection and parsing of all Git sources (collect/parse all Git sources) 1011 processing includes collecting and parsing the Git sources that include: any build manifest (e.g. Dockerfile, knative build yamls, travis yamls, etc.), configuration files (e.g., configMaps, environment variables file, etc.) and deployment assets (e.g., *.yaml files or custom deployment scripts). The discover all dependent sources 1012 processing includes analyzing the dependencies on the Git sources collected. In one embodiment, different Git sources are first semantically parsed by incorporating a domain knowledge. The parsed elements (e.g. packages, commands, configurations, etc.) are then analyzed further to identify if the parsed elements are responsible for determining a vulnerability or compliance state of the application being considered. If the parsed elements are identified as being responsible for determining the vulnerability or compliance state of the application under consideration, then their relationship to the application is captured and recorded in the graph db.

In one embodiment, the relationship to the application is in the form of level of aggregation. For example, software packages are contained in a Dockerfile, and the Dockerfile is stored within a repository. The order dependent sources 1013 processing includes placing the dependent sources in order of dependency based on the dependency chain of sources. In one embodiment, the index all sources and their ordering into the graph-db 1014 processing includes assigning the indexes for the sources in the graph-db. A database index allows a query to efficiently retrieve data from the graph-db. Indexes are related to specific tables and include one or more keys. A table can have more than one index built from it. The keys are the values desired to be looked up in the index. The keys are based on the tables' columns. By comparing keys to the index it is possible to find one or more database records with the same value. The graph-db may include a single database (DB) that stores sources for different Git repositories, thus common sources (nodes in the graph) are shared.

In one embodiment, the evaluation 1020 phase includes: access all V/C data assets from the graph-db 1021 processing, evaluate every V/C data asset 1022 processing, override/suppress/extend V/C status 1023 processing and aggregate and assign V/C status for every source in the DB 1024 processing. In one embodiment, the access all V/C data assets from the graph-db 1021 processing provides for a complete evaluation of every V/C data asset during evaluate every V/C data asset 1022 processing. During data collection 1010 phase all V/C data assets are identified and stored in the graph-db. In one embodiment, a standard graph-query language is used for the V/C data assets. The V/C data assets are queried back from the graph-db for accessing all the V/C data assets. In one embodiment, after the access all V/C data assets from the graph-db 1021 processing, every V/C data asset is evaluated for V/C status during the evaluate every V/C data asset 1022 processing. In one embodiment, the V/C data assets are identified as, for example, OS package, PYTHON® package, a configuration file, etc. Once these V/C data assets are identified in the graph-db 1021 processing, then these V/C data assets need to be evaluated for their vulnerability or compliance status. Any existing tools and techniques can be used to perform this evaluation processing. In one embodiment, the override/suppress/extend V/C status 1023 processing follows two general rules: (1) V/C status from the top (dependency) layer always take precedence over other (dependency) layers (e.g., providing a higher dependence layer precedence for the vulnerability and compliance status results for a top dependent source layer over other dependent source layers), and (2) the V/C status from the lower (dependency) layers are extended to a higher (dependency) layer only if corresponding sources are not present in the higher (dependency) layers (e.g., the vulnerability and compliance status results from dependent sources from lower dependent source layers are extended to a higher dependent source layer if corresponding sources are not present in the higher dependent source layers). These two general rules are standard rules in the overlay file systems in that when a new directory is overlay-ed on top of an existing directory, for any common files between the two layers, files in the top layer takes precedence. Docker images use an overlay file system and are subject to these standards. Every source in the graph-db are assigned a V/C status and aggregated during the aggregate and assign V/C status for every source in the DB 1024 processing.

Figure 11:
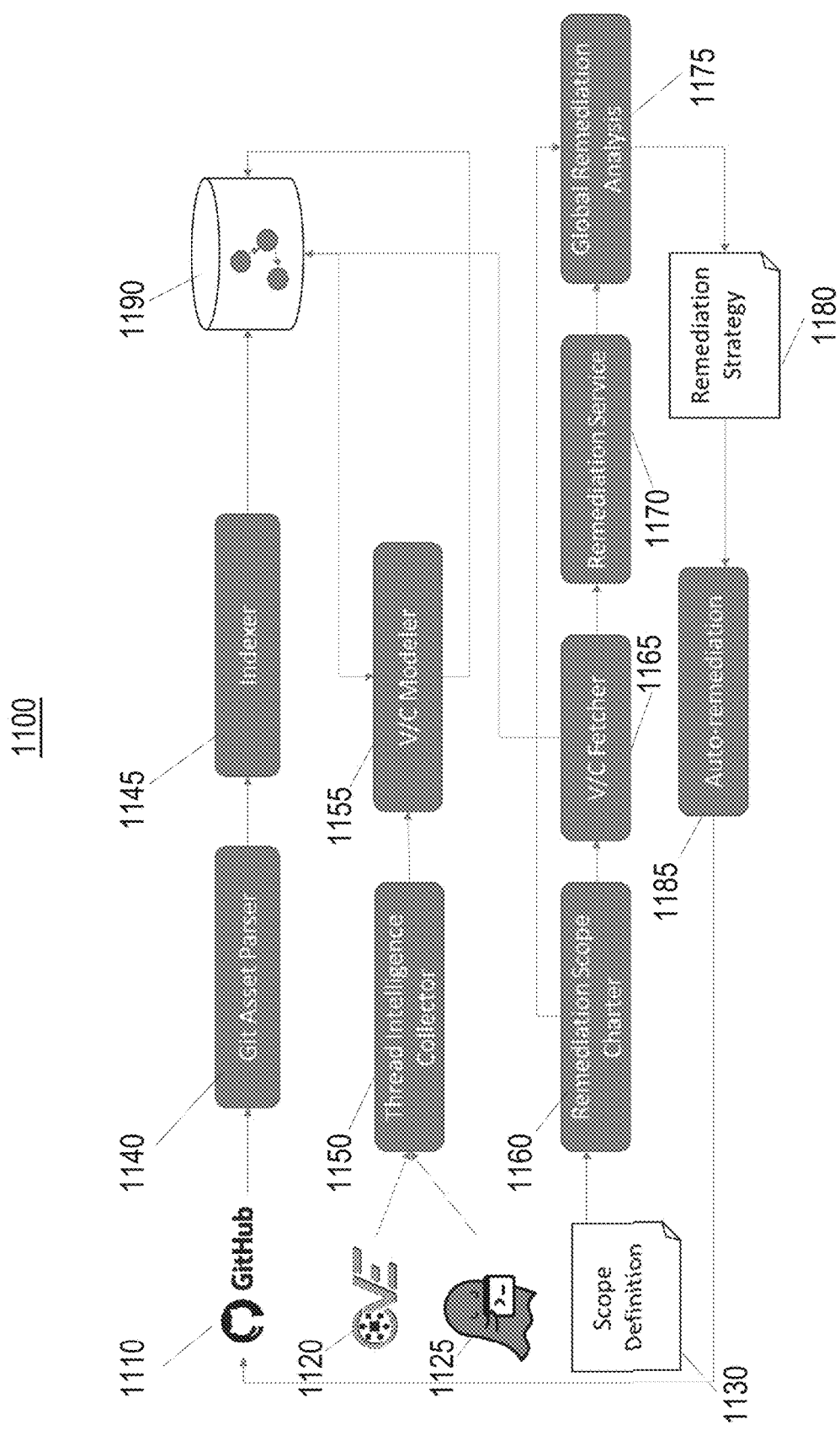
FIG. 11 illustrates a block diagram of a system architecture for optimizing remediation strategy for a DevSecOps framework, according to one embodiment.

In one embodiment, the remediation 1030 phase includes: identify scope for remediation 1031 processing, discover all V/C violations from the db 1032 processing, discover lowest common source (LCS) for each V/C 1033 processing and aggregate and recommend remediation at the LCS for each V/C 1034 processing. For the identify scope for remediation 1031 processing, the remediation scope determines the list of all Git sources from the DB that can be accessed. The remediation scope can be implicitly derived from Git organizations (e.g., all projects within a Git organization, etc.) or can be explicitly defined externally (e.g., all users in a certain group). In one embodiment, the discover all V/C violations from the DB (graph-db) 1032 processing finds all V/C status that are indicated as vulnerable. For the discover LCS for each V/C 1033 processing, for each V/C status in the graph-db, the LCS is discovered as the source across all Git sources that is within the remediation scope. For the aggregate and recommend remediation at the LCS for each V/C 1034 processing, at the LCS for each V/C status in the graph-db, the recommended remediations are aggregated. In one embodiment, once the processing determines the recommended remediations, the remediations may be manually processed or automatically processed FIG. 11 illustrates a block diagram of a system architecture 1100 for optimizing remediation strategy for a DevSecOps framework, according to one embodiment. In one embodiment, the sources include GitHub 1110, CVE dictionary 1120, any externally (blog post, newsletter or any other sources of vulnerabilities) discovered vulnerability 1125, and the scope definition 1130 (e.g., scope for remediation 1031, FIG. 10, etc.). In one embodiment, the Git Asset Parser 1140 provides for collection and parsing of all Git sources (collect/parse all Git sources 1011 processing, FIG. 10). In one embodiment, different Git sources are first semantically parsed by incorporating a domain knowledge. The parsed elements (e.g. packages, commands, configurations, etc.) are then analyzed further to identify if the parsed elements are responsible for determining a vulnerability or compliance state of the application being considered. If the parsed elements are identified as being responsible for determining the vulnerability or compliance state of the application under consideration, then their relationship to the application is captured and recorded in the graph db. In one embodiment, the relationship to the application is in the form of level of aggregation. For example, software packages are contained in a Dockerfile, and the Dockerfile is stored within the repository 1190. The indexer 1145 provides the assignment of indexes of all sources and their ordering into the graph-db 1014 (FIG. 10) that is stored in a repository 1190 by using standard graph query language. In one embodiment, the assignment and relationships are captured by the Git Asset Parser 1140 into a Json object (or any other format), the Indexer 1145 parses the result, and using the standard graph query language, the Indexer 1145 places the parsed result into the graph-db 1014, which is then stored in the repository 1190.

In one embodiment, the thread intelligence collector 1150 provides an aggregation of vulnerabilities or threats across various sources and models them in a single data model. The V/C modeler 1155 provides processing for discovering and assigning V/C status for all application components and updates the components in the graph-db 1014 (FIG. 10). The V/C modeler 1155 essentially assigns V/C status (compliant/non-compliant) with the precise source discovered in the graph-db 1014.

In one embodiment, the scope definition 1130 (e.g., provided by a user) specifies constraints in the remediation scope definition that helps identify applicable repositories in the remediation scope. In one embodiment, the remediation scope charter 1160 uses the scope definition 1130 to determine and assign the remediation scope to the applications. The remediation scope charter 1160 determines the scope of remediation, for example remediating a single application or multiple applications at once. All selected applications within the scope are considered for optimized remediation. The V/C fetcher 1165 obtains the V/C status for each application. The remediation service 1170 provides for determining a remediation analysis result from the vulnerability information, which includes the associated remediation solution (the vulnerability information is publicly available). The global remediation analysis 1175 analyzes the results of the remediation service 1170 processing and whether to ignore or assign remediation for applications. The remediation strategy 1180 processing determines which applications need to be remediated. The remediation strategy 1180 processing is essentially a culmination of the scope definition from a user and a remediation solution from the WC fetcher 1165. In one embodiment, the remediation strategy is smart enough to address all vulnerabilities and non-compliance issues for all elements within the scope (optimally) by taking into account their dependencies from the graph-db. The auto-remediation 1185 processing applies remediation to the applications to be remediated based on the strategy output by the remediation strategy 1180 processing. Remediation strategy is an actionable recipe for remediating all V/Cs across all applications in scope. The remediation strategy includes remediation solution as well as the order of remediation for all applications.

Figure 12:
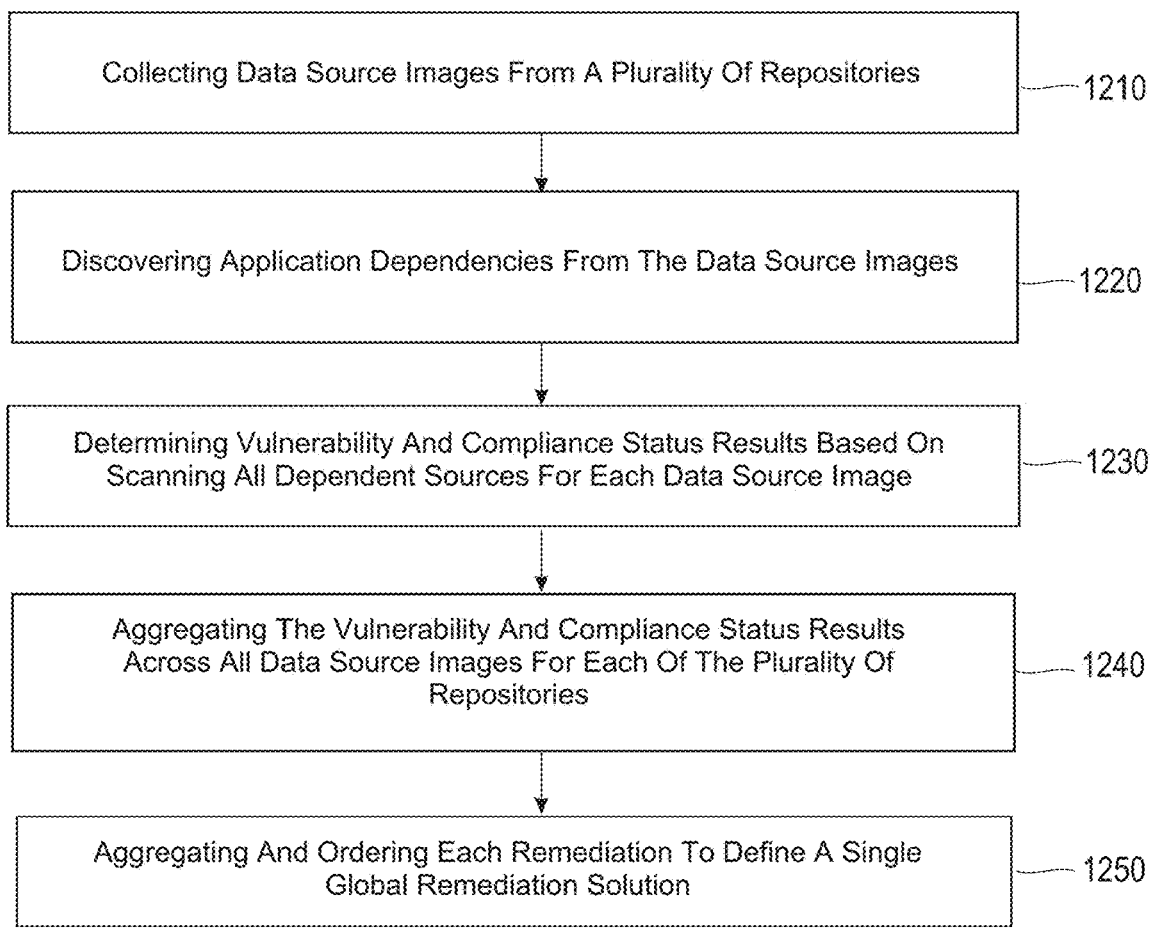
FIG. 12 illustrates a block diagram of a process for optimizing remediation strategy for a DevSecOps framework, according to one embodiment.

FIG. 12 illustrates a block diagram of a process 1200 for optimizing remediation strategy for a DevSecOps framework, according to one embodiment. In block 1210, process 1200 includes collecting data source images from multiple repositories (e.g., from Git repositories including: any build manifest (e.g. Dockerfile, knative build yamls, travis yamls, etc.), configuration files (e.g., configMaps, environment variables file, etc.) and deployment assets (e.g., *.yaml files or custom deployment scripts)), using a processor (from computing node 10, FIG. 1, hardware and software layer 60, FIG. 2, processing system 300, FIG. 3, system 400, FIG. 4, system 500, FIG. 5, system architecture 1100, FIG. 11, etc.). In block 1220, process 1200 discovers application dependencies from the data source images. In block 1230, process 1200 determines V/C status results based on scanning all dependent sources for each data source image (i.e., prior to an image build). In block 1240, process 1200 aggregates the V/C status results across all data source images for each of the multiple repositories. In block 1250, process 1200 aggregates and orders each remediation to define a single global remediation solution.

In one embodiment, process 1200 may further include ordering of dependent sources based on the application dependencies, and indexing the ordered dependent sources into a graph-db. In one embodiment, the aggregation of the V/C status results includes aggregation at every node of the graph-db.

In one embodiment, process 1200 further includes determining to override and accept the V/C status results based on dependence layer precedence. The dependence layer precedence may include providing a higher dependence layer precedence for the V/C status results for a top dependent source layer over other dependent source layers, and the V/C status results from dependent sources from lower dependent source layers are extended to a higher dependent source layer if corresponding sources are not present in the higher dependent source layers.

In one embodiment, in process 1200 may further include determining an LCS for remediation of each violation of the V/C status results. In one embodiment, the single global remediation solution is based on the LCS for each of the V/C status results. In one embodiment, in process 1200 may further include automatic performance of compliance remediation for the single global remediation solution. In one embodiment, in process 1200 the multiple repositories may include multiple Git repositories, and the graph-db stores sources for the multiple Git repositories. The graph-db is used for generation of a graphical representation (e.g., graphical representation 800, FIGS. 8-9) of source dependencies, and common sources are depicted as nodes (that are shared) in the graphical representation.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing, device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method comprising:
   collecting data source images from a plurality of repositories;
   discovering application dependencies from the data source images;
   determining status results based on vulnerability and compliance scanning of all dependent sources for each data source image;

aggregating the status results across all the data source images for each of the plurality of repositories;
determining remediations for violations indicated by the aggregated status results;
determining a lowest common source for the remediations of each of the violations of the vulnerability and compliance status results; and
aggregating and ordering each of the remediations to define a single global remediation solution.

2. The method of claim 1, further comprising:
ordering of the dependent sources based on the application dependencies; and
indexing the ordered dependent sources into a graph database;
wherein the status results comprise vulnerability and compliance status results, and aggregating the vulnerability and compliance status results comprises aggregation at every node of the graph database.

3. The method of claim 2, further comprising:
determining to override and accept the vulnerability and compliance status results based on dependence layer precedence.

4. The method of claim 3, wherein the single global remediation solution is based on the lowest common source for each of the vulnerability and compliance status results.

5. The method of claim 4, wherein the dependence layer precedence comprises: providing a higher dependence layer precedence for the vulnerability and compliance status results for a top dependent source layer over other dependent source layers, and the vulnerability and compliance status results from dependent sources from lower dependent source layers are extended to a higher dependent source layer if corresponding sources are not present in the higher dependent source layers.

6. The method of claim 1, further comprising:
automatically performing compliance remediation for the single global remediation solution.

7. The method of claim 2, wherein the plurality of repositories comprises a plurality of Git repositories, the graph database stores sources for the plurality of Git repositories, the graph database is used for generation of a graphical representation of source dependencies, and common sources are depicted as nodes in the graphical representation that are shared.

8. A computer program product for aggregate vulnerability and compliance remediation, the computer program product comprising a non-transitory computer readable storage medium having program instructions embodied therewith, the program instructions executable by a processor to cause the processor to:
collect, by the processor, data source images from a plurality of repositories;
discover, by the processor, application dependencies from the data source images;
determine, by the processor, status results based on vulnerability and compliance scanning of all dependent sources for each data source image;
aggregate, by the processor, the status results across all data source images for each of the plurality of repositories;
determine, by the processor, remediations for violations indicated by the aggregated status results;
determine, by the processor, a lowest common source for the remediations of each of the violations of the vulnerability and compliance status results;
and
aggregate and order, by the processor, each of the remediations to define a single global remediation solution.

9. The computer program product of claim 8, wherein the program instructions executable by the processor further cause the processor to:
order, by the processor, of dependent sources based on the application dependencies; and
index, by the processor, the ordered dependent sources into a graph database;
wherein the status results comprise vulnerability and compliance status results, and aggregating the vulnerability and compliance status results comprises aggregation at every node of the graph database.

10. The computer program product of claim 9, wherein the program instructions executable by the processor further cause the processor to:
determine, by the processor, to override and accept the vulnerability and compliance status results based on dependence layer precedence.

11. The computer program product of claim 10, wherein the single global remediation solution is based on the lowest common source for each of the vulnerability and compliance status results.

12. The computer program product of claim 11, wherein dependence layer precedence comprises: providing a higher dependence layer precedence for the vulnerability and compliance status results for a top dependent source layer over other dependent source layers, and the vulnerability and compliance status results from dependent sources from lower dependent source layers are extended to a higher dependent source layer if corresponding sources are not present in the higher dependent source layers.

13. The computer program product of claim 8, wherein the program instructions executable by the processor further cause the processor to:
automatically perform, by the processor, compliance remediation for the single global remediation solution.

14. The computer program product of claim 9, wherein the plurality of repositories comprises a plurality of Git repositories, the graph database stores sources for the plurality of Git repositories, the graph database is used for generation of a graphical representation of source dependencies, and common sources are depicted as nodes in the graphical representation that are shared.

15. An apparatus comprising:
a memory configured to store instructions; and
a processor configured to execute the instructions to:
collect data source images from a plurality of repositories;
discover application dependencies from the data source images;
determine status results based on vulnerability and compliance scanning of all dependent sources for each data source image;
aggregate the status results across all data source images for each of the plurality of repositories;
determine remediations for violations indicated by the aggregated status results;
determine a lowest common source for the remediations of each of the violations of the vulnerability and compliance status results; and
aggregate and order each of the remediations to define a single global remediation solution.

16. The apparatus of claim 15, wherein the processor is further configured to execute the instructions to:
order of dependent sources based on the application dependencies; and index the ordered dependent sources into a graph database;
wherein the status results comprise vulnerability and compliance status results, and aggregating the vulnerability and compliance status results comprises aggregation at every node of the graph database.

17. The apparatus of claim 16, wherein the processor is further configured to execute the instructions to:
determine to override and accept the vulnerability and compliance status results based on dependence layer precedence;
wherein the single global remediation solution is based on the lowest common source for each of the vulnerability and compliance status results.

18. The apparatus of claim 17, wherein dependence layer precedence comprises: providing a higher dependence layer precedence for the vulnerability and compliance status results for a top dependent source layer over other dependent source layers, and the vulnerability and compliance status results from dependent sources from lower dependent source layers are extended to a higher dependent source layer if corresponding sources are not present in the higher dependent source layers.

19. The apparatus of claim 16, wherein the processor is further configured to execute the instructions to:
automatically perform compliance remediation for the single global remediation solution.

20. The apparatus of claim 16, wherein the plurality of repositories comprises a plurality of Git repositories, the graph database stores sources for the plurality of Git repositories, the graph database is used for generation of a graphical representation of source dependencies, and common sources are depicted as nodes in the graphical representation that are shared.

* * * * *